March 20, 1956  I. M. ZIFF  2,739,012
AUTOMOBILE TOP LATCH

Filed Dec. 22, 1952  2 Sheets-Sheet 1

INVENTOR
Irving M. Ziff
BY
Willits, Helwig & Baillio
ATTORNEYS

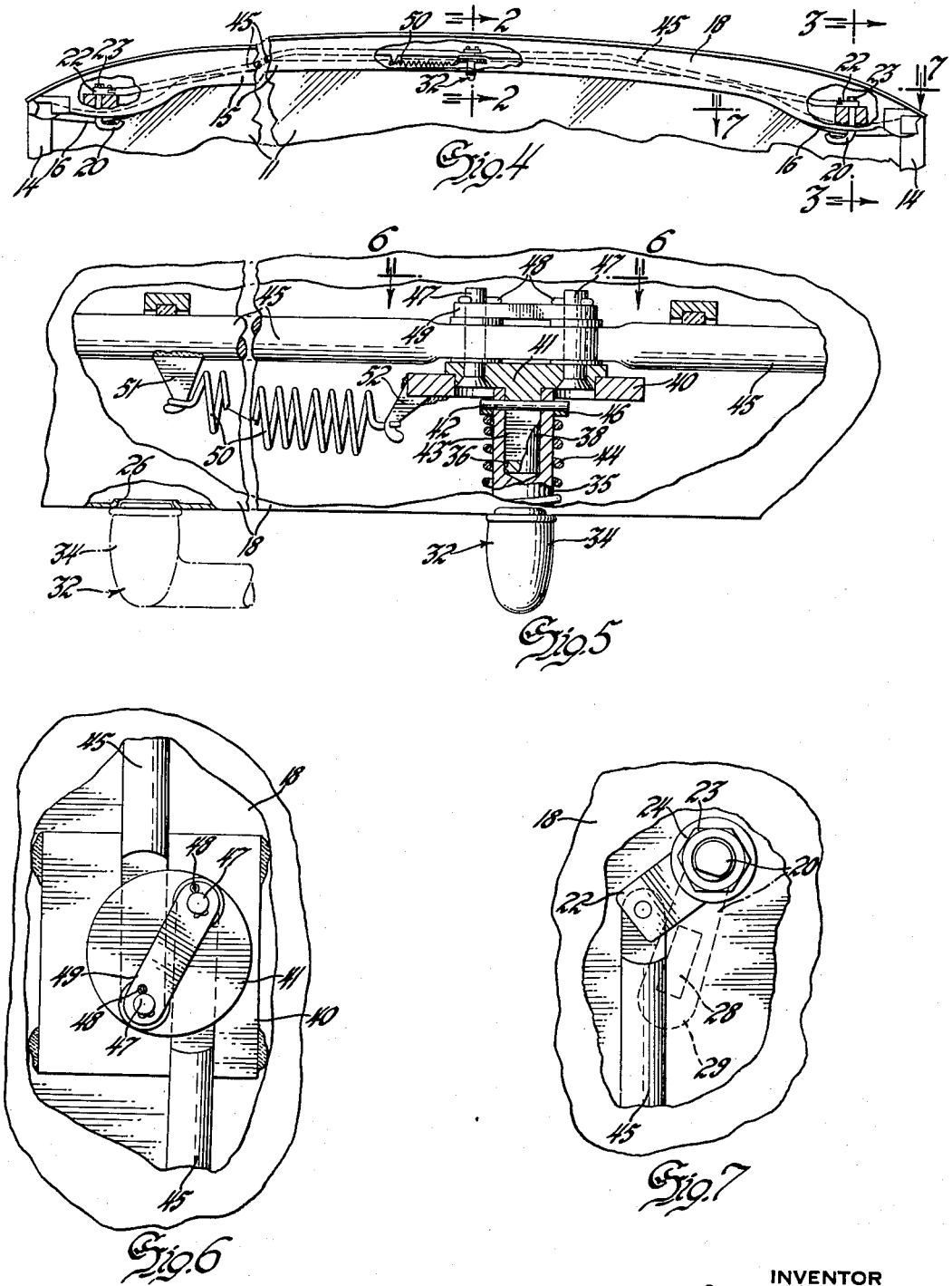

United States Patent Office 2,739,012
Patented Mar. 20, 1956

2,739,012

AUTOMOBILE TOP LATCH

Irving M. Ziff, Detroit, Mich., assignor to General Motors Corporation, Detroit, Mich., a corporation of Delaware Application December 22, 1952, Serial No. 327,246

8 Claims. (Cl. 296—120)

This invention relates to an automobile top latch, and more particularly to a convertible top latch having latching members adjacent opposite ends of the top front bow and a single operating handle intermediate the ends of said bow.

One feature of the invention is that it provides an improved top latch; another feature of the invention is that it provides a top latch which is self-aligning so that the front bow is automatically aligned in directions transverse of the automobile when the top is latched; a further feature of the invention is that it provides a positive lock wherein the top front bow is cammed down onto the windshield header bar to provide a positive seal; still another feature of the invention is that there are no studs or lugs protruding from the windshield header bar when the top is down; and yet a further feature of the invention is that the handle may be moved to an out of the way position underneath the top front bow when the top is latched, and the handle is frictionally held in this position.

Other features and advantages of the invention will be apparent from the following description and from the drawings, in which:

Fig. 4 is a partly broken away section taken along the line 4—4 of Fig. 1, showing the top front bow, portions being broken away to show underlying structure;

Fig. 5 is an enlarged detailed view of a portion of the operating mechanism which is carried inside the top front bow adjacent the center thereof;

Fig. 6 is a section taken along the line 6—6 of Fig. 5, showing the connections between the handle and the operating means; and Fig. 7 is an enlarged section taken along the line 7—7 of Fig. 4 and showing the connection between one latch member and the operating means.

Figure 1:
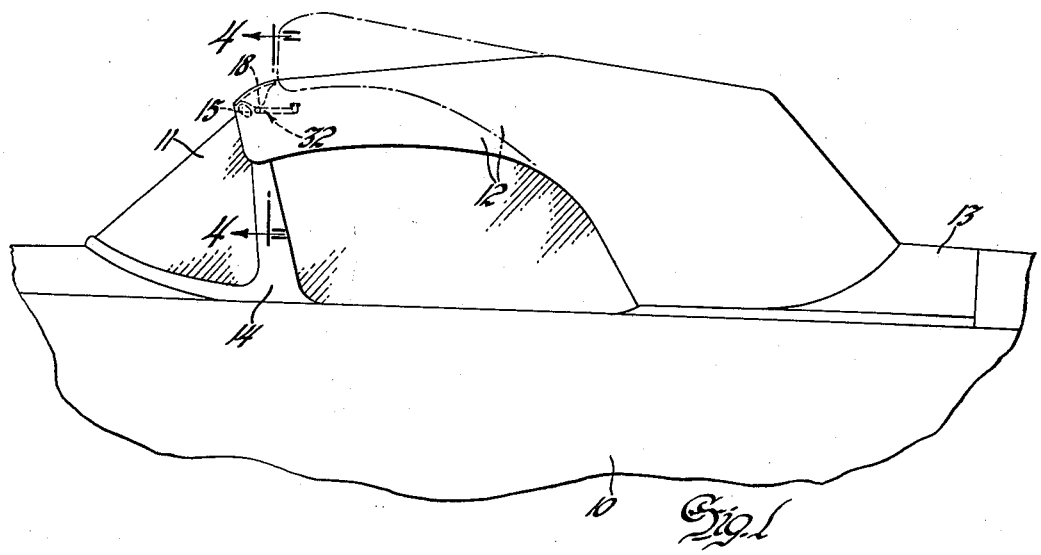
Fig. 1 is a fragmentary side elevational view of a convertible automobile provided with the improved top latch, the top being shown in latched position in solid lines and unlatched position in broken lines.
Figure 2:
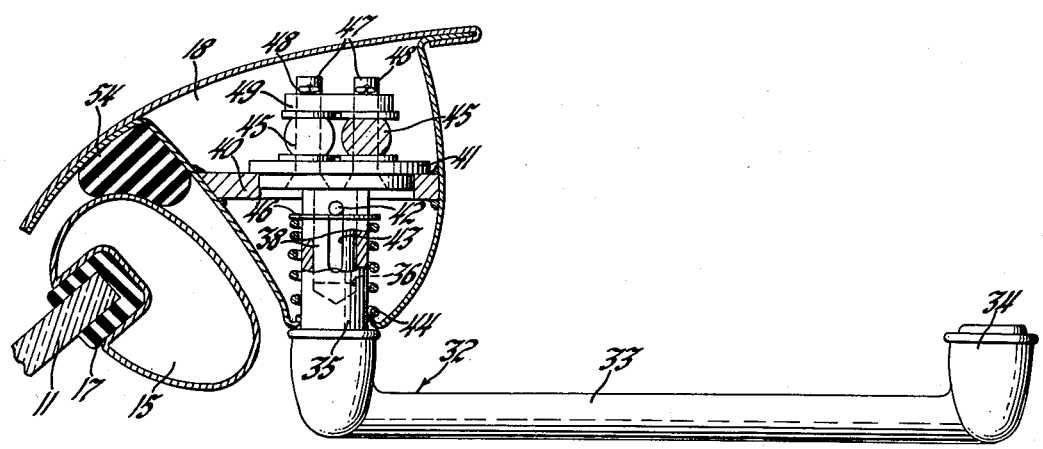
Fig. 2 is an enlarged transverse section through the header bar and top front bow taken adjacent the longitudinal center of the automobile along the line 2—2 of Fig. 4.
Figure 3:
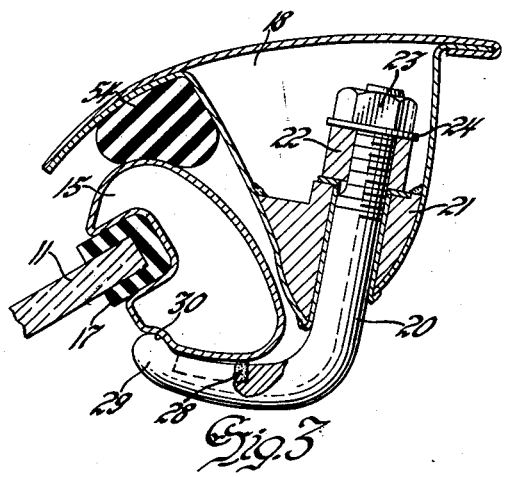
Fig. 3 is an enlarged transverse section through the header bar and top front bow taken adjacent the side of the automobile along the line 3—3 of Fig. 4.

Referring now more particularly to the drawings, a convertible automobile has a body 10 with a curved windshield 11 mounted thereon, and a convertible top 12 movable between closed position shown in Fig. 1 and an open position where the top is folded back adjacent the rear deck 13 of the automobile body. As shown in Figs. 2 and 3, the windshield 11 carries at its top a header bar 15 which is also curved in a horizontal plane to conform to the curved top edge of the windshield 11, and, as shown in Fig. 4, the underside of the header bar is swept downwardly at 16 adjacent the sides of the automobile, where the header bar is secured to pillars 14. A rubber mounting strip 17 mounted in a channel on the header bar 15 seats the top edge of the windshield 11.

At the front of the convertible top 12 (which conventionally is made of fabric) is a hollow top front bow 18, which, as shown in Fig. 4, extends entirely across the automobile. In the improved latch mechanism, latch members are provided adjacent each end of the bow 18 and a single operating handle is provided intermediate the ends of the bow 18, preferably at the centerline of the automobile.

Inasmuch as the latching devices at each side of the automobile are alike, the apparatus at one side only will be described in detail and similar parts at the other side of the automobile will be designated by similar reference characters. Adjacent the end of the bow 18 a hook-shaped latch member 20 is pivotally mounted in a support bushing 21 which is welded inside the bow 18. The top end of the latch member 20 is threaded, and one side of a portion of the shank of the latch member is flattened to make a nonrotatable connection with a link 22 retained on the latch member by a nut 23 and lock washer 24.

The latch is hook-shaped and has a nylon insert 28 (Figs. 3 and 7) in the bight thereof for engagement with the undersurface of the header bar 15 when the latch is in locked position. At its free end the hook is formed with a knob portion 29 which is adapted to be received in a groove 30 formed in the undersurface of the header bar 15. This groove preferably is about three quarters of an inch long and prevents the latch from slipping when the top is locked in raised position.

Near the longitudinal centerline of the automobile is a handle designated generally as 32, including a generally horizontal arm 33 formed at its free end with a gripping knob 34 and joining at its other end with a generally vertical shaft portion 35 which extends upwardly into the top front bow 18. Referring to Figs. 2 and 5, the shaft portion 35 of the handle is provided with a bore 36 into which is slidably fitted a shaft 38 which projects through a support plate 40 welded on the inside of the bow 18. At the upper end of the shaft 38 is a disk 41 which rides upon the upper surface of plate 40 and seats in a recess therein.

Yieldable means are provided for supporting the handle shaft 35 from the disk shaft 38. A pin 42 is journaled in an opening through the handle shaft 35, and the disk shaft 38 is formed with an elongated slot 43 (Fig. 2) through which pin 42 extends to provide a sliding telescopic connection between the shafts. A compression spring 44 is mounted on the shaft 35 between the lower surface of the bow 18 and a washer 46 which abuts the pin 42. This pin and slot construction provides for telescopic movement between the disk 41 and the handle parts 33, 34 and 35 so that when the top is latched by moving the handle from the position of Fig. 2 to a position parallel to the bow 18, the handle may move under the bow 18 where it is in an out of the way position, the top of the knob 34 engaging the underside of the bow 18 and being held in frictional engagement therewith by the force of the compression spring 44. A detent 26 (Fig. 5) in the undersurface of the bow 18 provides a "snap" type of frictional engagement.

Two similar operating rods 45 are mounted in the bow 18, one of these rods extending between each latch member 20 and the handle 32. As shown best in Fig. 7, one end of each rod 45 is pivotally connected to the end of one of the links 22 to form a crank connection between the rod 45 and the latch member 20, and as shown best in Fig. 6, eccentric pivotal connections are provided between each rod 45 and the disk 41. These connections are formed by rivets 47 projecting upwardly through the disk 41 and through the end of each rod 45. Cotter pins 48 prevent removal of the rods, and a tie bar 49 is provided between the two eccentric connections.

In order to bias the latch members 20 toward their retracted position wherein the hook portions of these members extend parallel to the header bar 15 so that they will clear the header bar when latch is released and the top is being raised or lowered, a tension spring 50 is provided. As shown in Fig. 5, one end of this spring is connected to a lug 51 projecting from operating rod 45 and the other end of the spring is connected to a lug 52 projecting from the support plate 40. This spring also exerts force to hold the latch members 20 in latched position.

In the operation of the top latch, when the latch members 20 are in retracted position as shown in Fig. 4, the handle shank 33 extends rearwardly, the parts being held in this position by the tension spring 50 so that the top can be raised or lowered without jamming the latches on the header bar 15. When the top has been raised, the handle is grasped and turned into parallel alignment with the bow 18 so that the disk with its eccentric connections rotates in a clockwise direction from the position of Fig. 6, and the operating rods 45 are moved axially in directions outwardly of the automobile. This axial movement of the actuating rods pivots the latch members 20 so that the hook portions of the latches are forced under the header bar 15 and positively pull the top down and lock it, bringing weatherstrip 54 on the bow 18 into sealing engagement with the header bar 15.

An important feature of this invention is that the bow 18 is automatically aligned in directions transverse of the automobile, thus eliminating the need for aligning studs which are found projecting from the header bar in many presently used latch constructions. Because the windshield is curved in a horizontal plane, extending farther rearwardly adjacent the sides than adjacent the center of the automobile, and because of the downwardly swept portions 16 at the sides of the header bar 15, the action of the latches as they move to latching position serves to cam the top front bow 18 into a true center position. If the top front bow 18 is misaligned and is too far to one side of the automobile, the latch member 20 on that side of the bow will engage the downswept portion 16 of the header bar and force the bow 18 into a true center position before the latch member at the other side of the automobile is engaged with the header bar. In addition to this self-aligning feature, the improved latch provides a positive lock which is not dependent on frictional engagement to hold the top in latched position, and in locking the top it is cammed down so that a good seal is provided between the top front bow 18 and the header bar 15.

While I have shown and described one embodiment of my invention, it is capable of many modifications. Changes, therefore, in the construction and arrangement may be made without departing from the spirit and scope of the invention as set forth in the appended claims.

I claim:

1. An automobile top latch of the character described, including: a curved windshield; a header bar atop said windshield having downwardly curved portions adjacent each end; a movable top front bow; a latch member pivotally mounted on said bow adjacent each end thereof, said latch members being simultaneously movable between a retracted position spaced from said header bar and a locked position in positive engagement with said header bar, the downwardly curved portions of the header bar being engaged by said latches to provide automatic alignment of said front bow in directions transverse of the automobile when the latch members are moved to locked position; a handle on said bow for moving said latch members; and operating means connecting said handle and latch members.

2. A convertible automobile top latch of the character described, including: a hollow top front bow; a latch member comprising a downwardly projecting hooked shaft pivotally mounted on said bow adjacent each end thereof for movement about its longitudinal axis; a handle pivotally mounted on said bow intermediate the ends thereof; operating means in said bow connecting said handle and latch members; and spring means biasing said latch members toward a retracted position.

3. A convertible automobile top latch of the character described, including: a top front bow; a latch member comprising a downwardly projecting hooked shaft pivotally mounted on said bow adjacent each end thereof for movement about the substantially vertical axis of said shaft; a handle pivotally mounted on said bow intermediate the ends thereof; an axially movable operating rod extending between each latch member and said handle; and crank means connecting each rod with said handle.

4. An automobile top latch of the character described, including: a stationary header bar; a movable top front bow; an elongated hook-shaped latch member pivotally mounted on said bow adjacent each end thereof and extending downwardly therefrom, each latch member being movable about its longitudinal axis between a retracted position spaced from said header bar and a locked position in positive engagement with the underside of said header bar, each latch member having its lower free end formed with a knob portion and said header bar being formed with grooves in its underside for receiving said knobs when the latch members are in locked position; a handle pivotally mounted on said bow intermediate the ends thereof; an axially movable operating rod in said bow extending between each latch member and said handle; means providing a crank connection between one end of each of said rods and one of said latch members; crank means connecting the other end of each rod with said handle; and spring means biasing said latch members toward retracted position.

5. An automobile top latch of the character described, including: a curved windshield; a curved header bar atop said windshield having downwardly curved portions adjacent each end; a movable top front bow; a latch member pivotally mounted on said bow adjacent each end thereof, said latch members being simultaneously movable between a retracted position spaced from said header bar and a locked position in positive engagement with said header bar, the downwardly curved portions of the header bar being engaged by said latches to provide automatic alignment of said front bow in directions transverse of the automobile when the latch members are moved to locked position; a handle pivotally mounted on said bow intermediate the ends thereof; an axially movable operating rod in said bow extending between each latch member and said handle; means providing a crank connection between one end of each of said rods and one of said latch members; crank means connecting the other end of each rod with said handle; and spring means biasing said latch members toward retracted position.

6. A convertible automobile top latch of the character described, including: a curved windshield; a header bar atop said windshield having downwardly curved portions adjacent each end with latch-receiving recesses in the underside of each downwardly curved portion; a latch member pivotally mounted on said bow adjacent each end thereof, each latch member comprising an elongated downwardly projecting shaft with a hook portion at its lower end, and each latch being movable about the axis of said shaft between a retracted position spaced from the header bar and a locked position wherein the hook portion is in positive engagement with the recesses in the underside of said header bar, the downwardly curved portions of the header bar being engaged by said latches to provide automatic alignment of said front bow in directions transverse of the automobile when the latch members are moved to locked position; a handle on said bow for moving said latch members; and operating means connecting said handle and latch members.

7. An automobile top latch of the character described, including: a stationary header bar; a movable top front bow; a latch member comprising a downwardly projecting shaft swingably mounted on said bow adjacent one end thereof, said latch member being movable about the axis of said shaft between a retracted position spaced from said header bar and a locked position in positive engagement with the underside of said header bar, said latch member having a free end formed with a knob portion and said header bar being formed with a groove in its underside for receiving said knob portion when the latch member is in locked position; a handle movably mounted on said bow at a point spaced from said latch; and operating means connecting said handle and latch.

8. An automobile top latch of the character described, including: a stationary header bar; a hollow top front bow; a latch member comprising a downwardly projecting hooked shaft pivotally mounted on said bow adjacent each end thereof for movement about the substantially vertical axis of said shaft; a handle pivotally mounted on said bow intermediate the ends thereof; an axially movable operating rod in said bow extending between each latch member and said handle; means in said bow providing a crank connection between one end of each of said rods and one of said latch members; and crank means in said bow connecting the other end of each rod with said handle, each latch member having its lower free end formed with a knob portion and said header bar being formed with grooves in its underside for receiving said knob portions when the latch members are in locked position.

References Cited in the file of this patent
UNITED STATES PATENTS

| | | |
|---|---|---|
| 2,305,715 | Keller | Dec. 22, 1942 |
| 2,486,905 | Ackermans | Nov. 1, 1949 |
| 2,586,648 | Hale | Feb. 19, 1952 |